US007720869B2

(12) United States Patent
Frieder et al.

(10) Patent No.: US 7,720,869 B2
(45) Date of Patent: May 18, 2010

(54) HIERARCHICAL STRUCTURED ABSTRACT FILE SYSTEM

(75) Inventors: Ophir Frieder, Chicago, IL (US); Sanjiv Kapoor, Naperville, IL (US); Nandakiran Kirubanandan, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 245 days.

(21) Appl. No.: 11/801,296

(22) Filed: May 9, 2007

(65) Prior Publication Data

US 2008/0281788 A1  Nov. 13, 2008

(51) Int. Cl.
*G06F 7/00* (2006.01)
(52) U.S. Cl. .............. 707/796; 707/797; 707/778; 715/733; 715/764; 715/853
(58) Field of Classification Search ............... 707/10, 707/100–102, 104.1, 796, 797, 778; 715/733, 715/764, 853
See application file for complete search history.

(56) References Cited

U.S. PATENT DOCUMENTS

| | | | | | |
|---|---|---|---|---|---|
| 5,355,497 | A | * | 10/1994 | Cohen-Levy | 707/200 |
| 5,544,360 | A | * | 8/1996 | Lewak et al. | 707/1 |
| 5,644,736 | A | * | 7/1997 | Healy et al. | 715/784 |
| 5,678,046 | A | * | 10/1997 | Cahill et al. | 707/200 |
| 5,689,701 | A | * | 11/1997 | Ault et al. | 707/10 |
| 5,848,415 | A | * | 12/1998 | Guck | 707/10 |
| 5,905,990 | A | * | 5/1999 | Inglett | 707/200 |
| 6,582,474 | B2 | * | 6/2003 | LaMarca et al. | 715/234 |
| 6,594,675 | B1 | * | 7/2003 | Schneider | 707/200 |
| 7,107,416 | B2 | * | 9/2006 | Stuart et al. | 711/159 |
| 7,146,388 | B2 | * | 12/2006 | Stakutis et al. | 707/204 |
| 7,254,570 | B2 | * | 8/2007 | Stickler | 707/3 |
| 7,305,377 | B2 | * | 12/2007 | Shinkai et al. | 707/1 |
| 7,526,621 | B2 | * | 4/2009 | Stuart et al. | 711/159 |
| 2001/0041989 | A1 | * | 11/2001 | Vilcauskas et al. | 705/1 |
| 2003/0204515 | A1 | * | 10/2003 | Shadmon et al. | 707/100 |
| 2004/0037540 | A1 | * | 2/2004 | Frohlich et al. | 386/96 |
| 2005/0177567 | A1 | * | 8/2005 | Hughes et al. | 707/5 |
| 2006/0031261 | A1 | * | 2/2006 | Behringer | 707/3 |
| 2006/0074925 | A1 | * | 4/2006 | Bixby et al. | 707/100 |

(Continued)

OTHER PUBLICATIONS

"Sever Institute of Technology Department of Computer"—M. Saint Louis—citeseerx.ist.psu.edu—Aug. 2004 CiteSeer (pp. 1-223).*

(Continued)

*Primary Examiner*—John E Breene
*Assistant Examiner*—Anh Ly
(74) *Attorney, Agent, or Firm*—Pauley Petersen & Erickson

(57) ABSTRACT

A method in a data processing system of searching a plurality of electronic files identified by filenames in a first hierarchical file structure that is on a recordable medium of the data processing system. A user-defined metalabel is assigned to each of the electronic files. The electronic files are organized as a function of the metalabels into a second hierarchical file structure existing simultaneously with the first hierarchical file structure on the recordable medium of the data processing system. A search query is received from a user and the metalabels of the second hierarchical file structure are searched as a function of the query. Each electronic file having a metalabel matching the query is returned to the user as a search result.

18 Claims, 5 Drawing Sheets

U.S. PATENT DOCUMENTS

| | | | |
|---|---|---|---|
| 2006/0129569 A1* | 6/2006 | Dieberger et al. | 707/100 |
| 2006/0206449 A1* | 9/2006 | Fletcher et al. | 707/1 |
| 2006/0206450 A1* | 9/2006 | Fletcher et al. | 707/1 |
| 2006/0235871 A1* | 10/2006 | Trainor et al. | 707/102 |
| 2006/0282440 A1* | 12/2006 | Fletcher et al. | 707/100 |
| 2006/0287974 A1* | 12/2006 | Mochizuki et al. | 707/1 |
| 2007/0162462 A1* | 7/2007 | Zhang et al. | 707/10 |
| 2007/0204011 A1* | 8/2007 | Shaver et al. | 709/219 |
| 2007/0209005 A1* | 9/2007 | Shaver et al. | 715/733 |
| 2008/0104132 A1* | 5/2008 | Toner | 707/201 |
| 2008/0216009 A1* | 9/2008 | Drallos | 715/776 |
| 2008/0307339 A1* | 12/2008 | Boro et al. | 715/764 |
| 2009/0119344 A9* | 5/2009 | Toner | 707/201 |
| 2009/0119354 A1* | 5/2009 | Stuart et al. | 707/206 |
| 2009/0228462 A1* | 9/2009 | Frieder et al. | 707/3 |

OTHER PUBLICATIONS

"A Support-Ordered Trie for fast frequent itemset discovery"—Y Woon, WK Ng and EP Lim—IEEE Transactions on Knowledge—2004—computer.org (pp. 1-25).*

Alexander Ames et al., "Richer File System Metadata Using Links and Attributes," *Proceedings of the 22<sup>nd</sup> IEEE / 13<sup>th</sup> NASA Goddard Conference on Mass Storage Systems and Technologies (MSST 2005)*, Monterey, CA, Apr. 2005. (12 pages).

Stephan Bloehdorn et al., "TagFS—Tag Semantics for Hierarchical File Systems,"Proceedings of the 6th International Conference on Knowledge Management, Graz, Austria (Sep. 6-8, 2006), (8 pages).

Charles P. Wright et al., "Versatility and Unix Semantics in a Fan-Out Unification File System", Technical Report FSL-04-01b (Jan. 2004) (14 pages).

M. Mahalingam et al., "Towards a Semantic, Deep Archival File System," Technical Report HPL-2002-199, HP Laboratories, Palo Alto, Jul. 2002, (7 pages).

M. Olson, "The Design and Implementation of the Inversion File System," In proceedings of the Winter 1993 USENIX Technical Conference, pp. 205-217, San Diego, California, USA, Jan. 1993, (14 pages).

Y. Padioleau et al., "A Logic File System," In proceedings of the 2003 USENIX Annual Technical Conference, pp. 99-112, San Antonio, Texas, Jun. 2003, (28 pages).

http://www.apple.com/macosx/features/spotlight/ Apple—Mac OS X—Spotlight (2 pages), web pages printed Aug. 1, 2007 (Apple's Spotlight was originally introduced in Apr. 2005).

http://msdn.microsoft.com/msdnmag/issues/04/01/WinFS/ Code Name WinFS: Revolutionary File Storage System Lets Users Search and Manage File Based on Content, Jan. 2004 (11 pages).

David K. Gifford et al., "Semantic File Systems," Proceedings of the 13th ACM Symposium on Operating Systems Principles, New York, NY, (1991), (10 pages) (the year of publication is sufficiently earlier than the effective U.S. filing date so that the particular month of publication is not in issue).

* cited by examiner

HIERARCHICAL STRUCTURED ABSTRACT FILE SYSTEM

BACKGROUND OF THE INVENTION

1. Field of the Invention

This invention is directed to improving the searching of electronic files in a data processing system.

2. Discussion of Related Art

Traditional file systems, including both UNIX and WINDOWS, have one hierarchical method of file organization, herein referred to as a traditional or first hierarchical file structure, which is tree structured with directories and subdirectories. A typical user may have a large set of files (say 100,000) and the structured tree file organization can be several levels in height. The primary characteristics of the file systems are: 1) a file is accessed by a unique address known as the file path; and 2) file organizing is by using directories, subdirectories, and filenames with an extension.

This single method of organizing data leads to considerable inefficiencies in accessing files. Searching is effective when the user knows a partial filename and/or the file path or directory under which the file is stored. Often a user must go through a number of files before locating a set of relevant files, and must open a number of directory/subdirectory folders to access the files. Further the current hierarchical organizing technique does not allow the users to easily describe or annotate a file.

To improve the search, current file systems use a variety of techniques. As an example, Mac OS uses a SPOTLIGHT feature that indexes files on your computer in the background based upon keywords. When a user makes a change, such as adding a new file, receiving an email, or entering a new contact, SPOTLIGHT updates its index automatically, with the intention of keeping search results accurate. Embedding keywords into files is a common technique for providing a search facility to the user. Keywords are generally indexed in a database that is used to answer user queries.

There is a need for an improved method for searching files on a computer, as well as organizing the search results.

SUMMARY OF THE INVENTION

A general object of the invention is to provide an improved method for organizing and searching for one or more electronic files on a computer-readable recordable medium, and the program code(s) for carrying out the method in a data processing system.

A more specific objective of the invention is to overcome one or more of the problems described above.

The general object of the invention can be attained, at least in part, through a method in a data processing system of searching electronic files that are on a recordable medium of the data processing system. The method includes: providing an electronic file in a first hierarchical file structure, the electronic files being identified by a filename; assigning a user-defined metalabel to the electronic file, wherein the electronic file includes the filename and the metalabel; organizing the electronic file into a second hierarchical file structure as a function of the metalabel; receiving a query from a user; searching the second hierarchical file structure as a function of the query; and returning to the user the electronic file. The second hierarchical file structure is achieved without replicating the files of the first hierarchical file structure.

The invention further comprehends a method in a data processing system of searching a plurality of electronic files in a first hierarchical file structure that is on a recordable medium of the data processing system, where each of the electronic files includes a filename. The method includes: assigning a user-defined metalabel to each of the electronic files; organizing the electronic files as a function of the metalabels into a second hierarchical file structure existing simultaneously with the first hierarchical file structure on the recordable medium of the data processing system; receiving a query from a user; searching the metalabels of the second hierarchical file structure as a function of the query; and returning to the user as a search result each of the electronic files having a metalabel matching the query.

The invention still further comprehends a computer-readable medium encoded with instructions for organizing a plurality of electronic files of a data processing system. The encoded instructions include a first program code establishing a first hierarchical file structure that includes the plurality of electronic files. Each of the plurality of electronic files is identified by a filename in the first hierarchical file structure. The encoded instructions also include a second program code establishing a second hierarchical file structure including the plurality of electronic files. Each of the plurality of electronic files is identified by a user-defined metalabel in the second hierarchical file structure. The first and second hierarchical file structures exist simultaneously for the plurality of electronic files.

The method of this invention provides an additional file organization system that extends the file organization into a multi-hierarchy user defined system. The additional hierarchal file structures of this invention are abstract file structures, as they exist in the background and are not conventionally viewed through a user interface like the traditional file directories, subdirectories, and filenames. However, they can also be viewed in the same way although their physical existence will be according to the first hierarchy. In the system of this invention the data are organized into multiple hierarchical forms which aid considerably in searching and organizing search results, i.e., files, in a structured fashion.

As an example consider the following structure (directories/subdirectories) of electronic files, represented in FIG. 1.

Pictures/2006/dad
Pictures/2005/dad
Pictures/2006/mom
Pictures/2005/mom
Picture/2006/baby
Pictures/2005/baby If a user wanted to access all files which involve dad, even files not having "dad" in the filename but including dad in the picture, the number of files may be substantial and spread among multiple subdirectories. Thus, if you were looking for all dad-related pictures, it would be desirable that these pictures may be classified as below, and as shown in the abstract directory structure of FIG. 2.

Pictures/dad/2005
Pictures/dad/2006
Pictures/dad/baby
Pictures/dad/mom

The method of this invention provides a way to provide, in a general sense, multiple organizational tree structures for the same electronic files in addition to the traditional file directory tree structure. These additional hierarchical file structures are provided by this invention by structuring the electronic files in one or more abstract directories according to user-defined metalabels. When the user searches based upon an assigned metalabel, the program code implementing this invention provides the corresponding electronic files in a new file directory, such as shown in FIG. 2. As the directory of FIG. 2 exists as a result of wanting all pictures identified by the metalabel "dad", the directory of FIG. 2 is an abstract directory that is created in response to a query for the "dad" metalabel and exists simultaneously with, and does not replace or alter, the first hierarchical file structure of FIG. 1.

Other objects and advantages will be apparent to those skilled in the art from the following detailed description taken in conjunction with the appended claims and drawings.

BRIEF DESCRIPTION OF THE DRAWINGS

These and other objects and features of this invention will be better understood from the following detailed description taken in conjunction with the drawings, wherein.

DEFINITIONS

Figure 1:
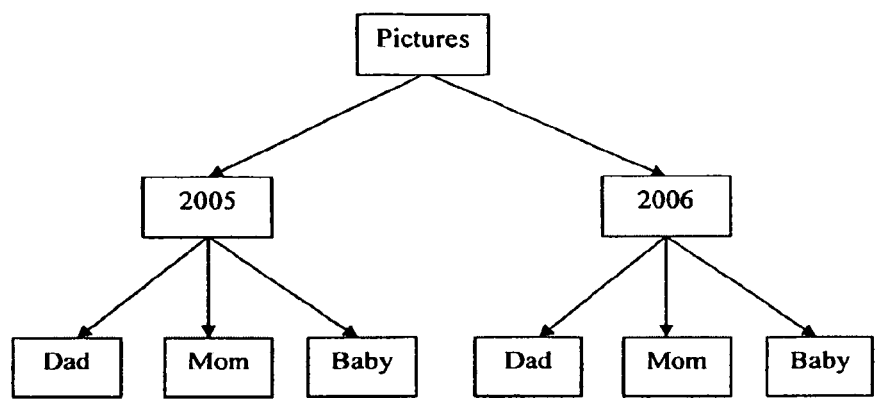
FIG. 1 is a simplified representation of traditional hierarchical file structure.

Within the context of this specification, each term or phrase below will include the following meaning or meanings.

References herein to "metalabel" are to be understood to refer to an identifier given to an electronic file in addition to the file's filename. A metalabel of this invention can include any combination of characters, e.g., letter or numbers, and desirably includes a term that a user identifies with the file.

References herein to "user" are to be understood to not be limited to a creator of an electronic file, but can be any person, process, or autonomous software agent, as known in the art, acting on behalf of a user having access to the electronic files.

References herein to a "first hierarchical file structure" or a "traditional hierarchical file structure" are interchangeable and to be understood to refer to the already existing directory tree structure commonly used in organizing electronic files in data processing systems. The first or traditional hierarchical file structure generally includes a plurality of directories and subdirectories, and individual files are given a filename and a file's placement in the tree structure is identified by a file path.

References herein to the "second hierarchical file structure" or "additional hierarchical file structure" of this invention are interchangeable and to be understood to refer to a different hierarchical file structure than the first or traditional hierarchical file structure.

References herein to "abstract directory" are to be understood to refer to a directory in or created for the second hierarchical file structure of this invention.

DESCRIPTION OF PREFERRED EMBODIMENTS

The present invention provides a method in a data processing system, e.g., a computer, for organizing and of searching electronic files on a recordable medium of the data processing system, e.g., the computer's hard drive or flash drive. It is important to note that this invention is not limited to recordable medium that is physically adjacent to a computer. Instead, it is also within the scope of this invention that some and possibly all of the files reside in remote locations whose access is via a network including but not limited to such networks as local area networks, wide area networks, private virtual networks, ad hoc networks, and the Internet.

Also, users according to this invention, as defined above, are not limited to human users. That is, as known in the art, processes or other autonomous software agents can assist or even replace humans in terms of computer processing. Thus, it is within the scope of this invention for processes or software agents to generate the user request described herein.

The method of this invention improves searching for electronic files in, for example, current existing hierarchical file structures, such as are formed of the directories and subdirectories currently employed in operating systems. In such traditional hierarchical file structures, often referred to as tree structures, each of the electronic files includes a given filename that is seen by the user through a user interface, e.g., computer monitor, and a file path identifying the location within the hierarchical file structure.

As discussed above, current searching of the electronic files in the traditional hierarchical file structure, as represented in FIG. 1, is typically based upon the filename or other information about the file itself, such as the file type or extension. The method of this invention provides a second hierarchical file structure, and desirably a plurality of additional hierarchical file structures. These additional hierarchical file structures are "abstract" in that they remain in the background, do not require a physical presence that is directly accessible to the user through the user interface, as does the first hierarchical file structure, but may be viewable in a similar fashion. The abstract additional hierarchical file structures of this invention supplement, and do not replace or replicate portions of, the first hierarchical file structure to improve searching of the electronic files in the hierarchical file structure.

In one embodiment of this invention, each of at least a portion of the electronic files stored in a data processing system is assigned a user-defined metalabel. The computer code that implements all or portions of the method of this invention receives the user-defined metalabel, such as through a keyboard, and assigns the metalabel to the intended electronic file. The metalabel does not supplant the file name of the electronic file.

Figure 2:
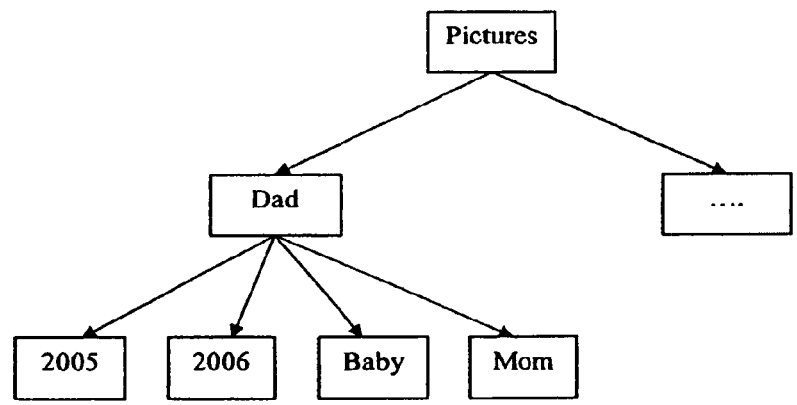
FIG. 2 is an exemplary abstract directory structure adapted from the traditional hierarchical file structure of FIG. 1, according to one embodiment of this invention.

The metalabel of this invention provides users with the possibility to describe or annotate a file with user defined words and/or numbers, which allows another way to search for the files. The electronic files are searched in this invention by querying the metalabels. The data processing system receives a query from a user, searches the metalabels of the second hierarchical file structure according to the query, and returns to the user the search results, which include the electronic file or files including a metalabel matching the query. In one embodiment, the search results are provided in or by an abstract directory structure, such as illustrated in FIG. 2. The query can include the full metalabel, or a portion of the metalabel. In one embodiment of the invention, the query can include a portion of the metalabel coupled with a wildcard symbol, such as, for example, an asterisk or other character, to represent one or more letters or numbers.

In one embodiment of this invention, a program code organizes the electronic files as a function of the metalabels into a second hierarchical file structure existing simultaneously with the first hierarchical file structure on the recordable medium of the data processing system. A plurality of metalabeled electronic files are organized into one or more additional hierarchical file structures by linking each metalabel of the electronic files to a matching metalabel assigned to one or more of the other electronic files. Each metalabel that is assigned to an electronic file is linked to a matching metalabel, should such a matching metalabel exist, of an other electronic file. The link between the metalabels remains even when one or more electronic files are, for example, moved or given a new file name. The additional file structures provided by the metalabels are desirably automatically updated when, for example, an electronic file is moved within, copied, or deleted from the first and traditional hierarchical file structure.

In one embodiment of this invention, hierarchical metalabels have the form:

| | |
|---|---|
| (i) | <metalabel> or |
| (ii) | <metalabel1>/<metalabel2>/... <metalabelk>. |

Figure 3:
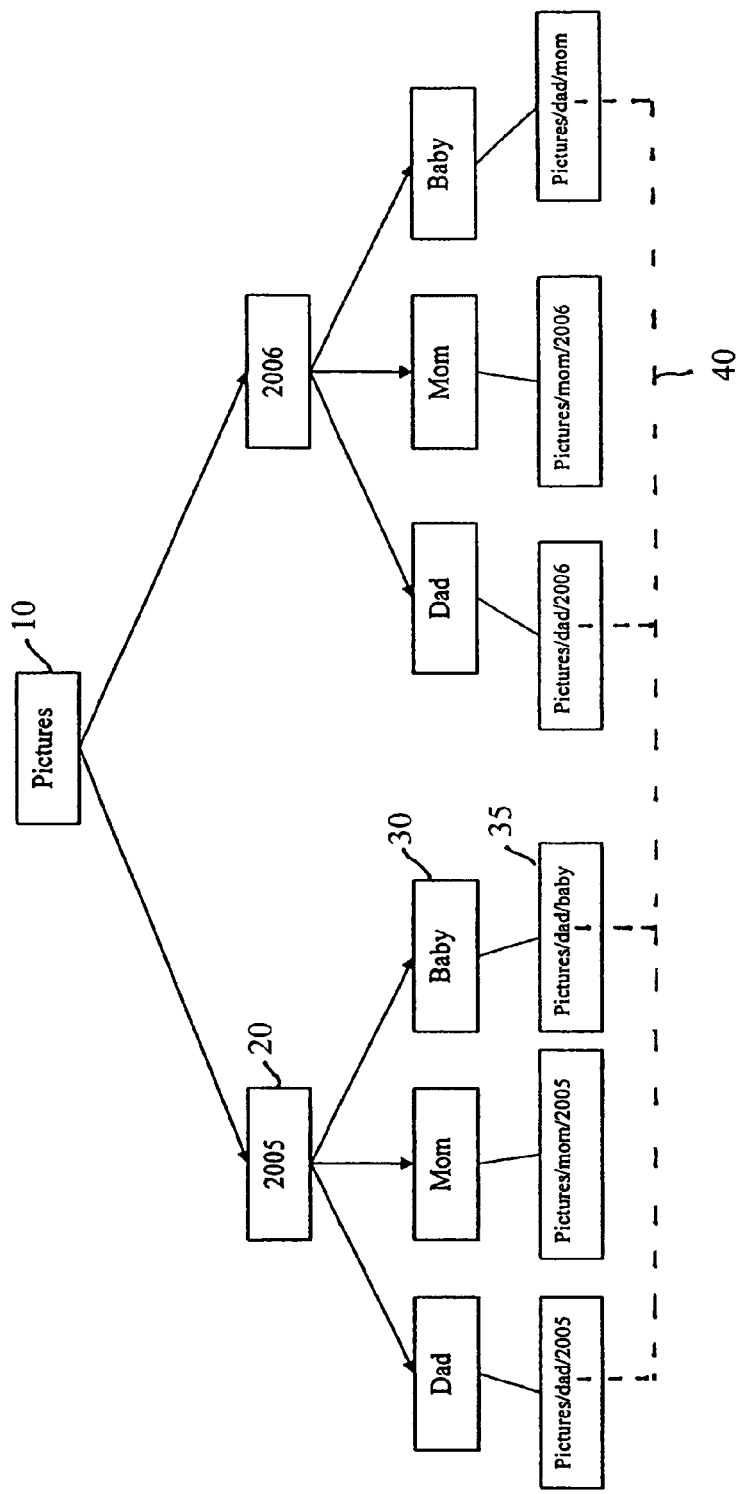
FIG. 3 represents a simplified application of metalabels to electronic files in the traditional hierarchical file structure of FIG. 1, according to one embodiment of this invention.

Metalabel form (i) provides a flat result with all the search results in one single abstract directory. Metalabel form (ii) supports structured searching and reporting. As an example referring to the file structure of FIG. 1, the following metalabels could be assigned to electronic files therein as shown in FIG. 3:

Pictures/dad/2005
Pictures/dad/2006
Pictures/dad/baby
Pictures/dad/mom
Pictures/mom/2005
Pictures/mom/2006

A query for "Pictures/" would provide an abstract directory with the subdirectories "dad" and "mom" and the search for "Pictures/dad" would provide an abstract directory with the subdirectories "2005/", "2006/", "baby/", and "mom". In general, a search for <Dir>/ provides all files labeled <Dir>/<file> and all directories, <dir>, of files labeled */<Dir>/<dir>/*. As will be appreciate by those skilled in the art following the teachings herein provided, directories may also be assigned metalabels with the same methodology as described herein for individual files.

The metalabels allow a system user to further describe or label a file according to, for example, the content or purpose of the file. Referring to FIG. 3, the electronic file 35 is in subdirectory 30 named "Baby", which is in subdirectory 20 named "2005", which is in directory 10 named "Pictures". The user, e.g., the file creator, enters a metalabel "Pictures/dad/baby" for the electronic file 35. In this example, the electronic file 35 is a picture that includes both dad and baby, and while the placement in the traditional file structure places the electronic file in the "Baby" subdirectory 30, associating the metalabels "dad" and "baby" allows the computer to link this file with other similar metalabeled files in other subdirectories. As shown in FIG. 3, the dashed line 40 indicates the linking for the metalabels "dad". Thus a query of the metalabel "dad" provides as search results the linked files. As discussed above, the abstract directories resulting from the query for metalabel "dad" would be "2005/", "2006/", "baby/", and "mom/" as illustrated in FIG. 2.

Figure 4:
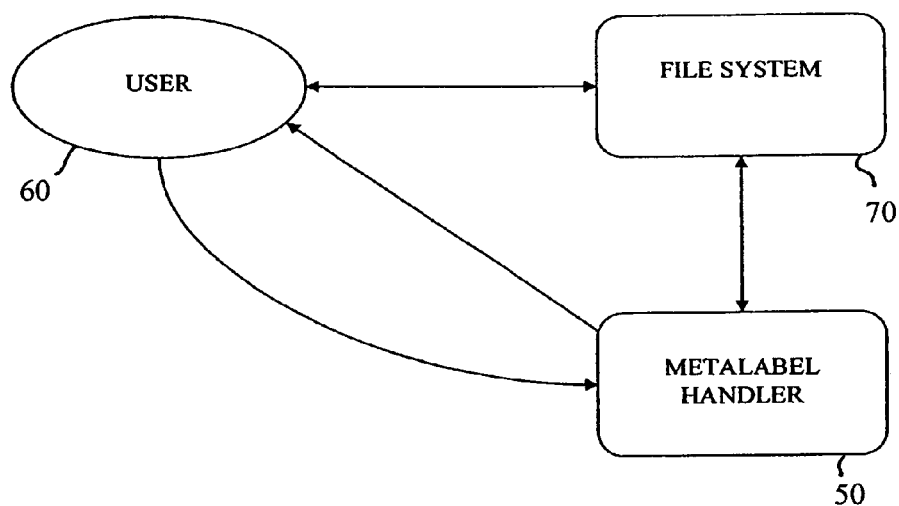
FIG. 4 is a representation of the interaction between the user and the file system according to one embodiment of this invention.

In one embodiment of this invention, a metalabel handler module or functionality, desirably implemented as a client-server module, is provided in the data processing system. As represented in FIG. 4, the metalabel handler 50 interacts with the user 60 to manage the user's metalabel manipulations, including commands such as add, modify, and remove metalabels for files. The metalabel handler 50 also desirably implements the metalabel search functions of this invention. The metalabel handler 50 interacts with the existing traditional hierarchical file structure, i.e., file system 70, to serve the requests from the client, user 60, and make the requested modifications to update the additional hierarchical file structure(s) whenever an electronic file is moved, copied, or deleted.

In one embodiment of this invention, the additional hierarchical file structures are implemented as tries, and desirably Patricia tries. In this embodiment electronic files are organized into a second hierarchical file structure by locating or creating a node in the trie that is identified with the metalabel of the file and associating the filename to the metalabel in the trie. As an alternative, and more desirably used in combination in the double trie structure discussed below, organizing the metalabel into the second hierarchical file structure is accomplished by locating or creating a node in the trie that is identified with the filename and associating the metalabel to the filename in the trie.

Figure 5:
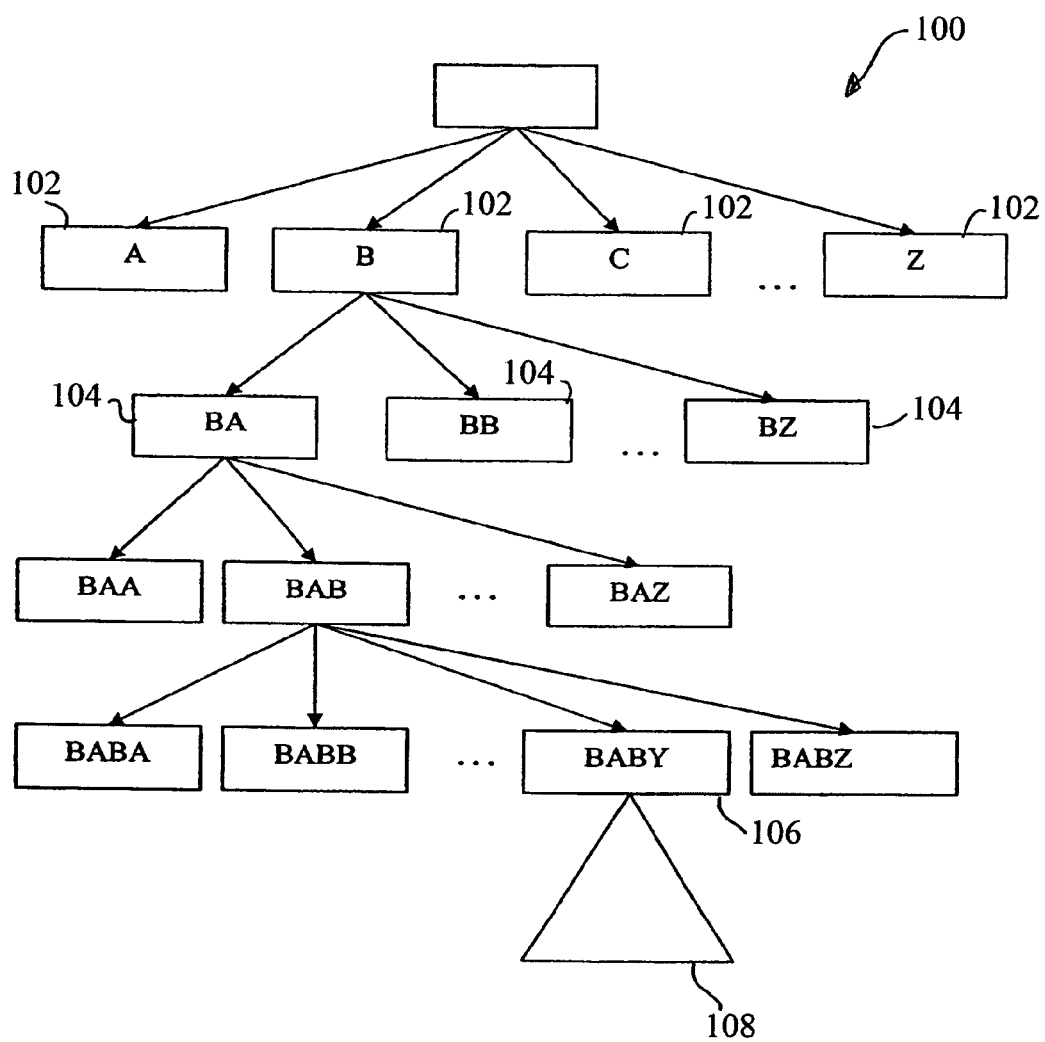
FIG. 5 is a theoretical trie structure for illustrative purposes.

FIG. 5 illustrates a general hypothetical trie structure 100 to provide a preliminary understanding to assist in the explanation of the subject invention, and is not intended to limit the invention in its application. In the hypothetical trie structure 100 of FIG. 5, there is a node 102 available for each letter of the alphabet. Note that herein the approach is illustrated using an English language character set, but one skilled in the art will recognize that any character set is possible. Referring to the node for "B", each node 102 will connect to a further plurality of available nodes 104 representing "B" plus a further letter, i.e., "BA"-"BZ". The trie structure of FIG. 5 continues in this manner and ultimately provides the node 106 for "BABY". According to this invention, the "BABY" node 106 contains the electronic files, and more accurately, the filenames and file paths of the electronic files, associated with the metalabel "BABY". The electronic files are represented in FIG. 5 by triangle 108. Thus, when a new file and/or metalabel is/are added, the data processing system organizes the metalabel into the trie structure of the additional hierarchical file structure and associates the filename with a corresponding node. The electronic file is desirably not duplicated.

Figure 6:
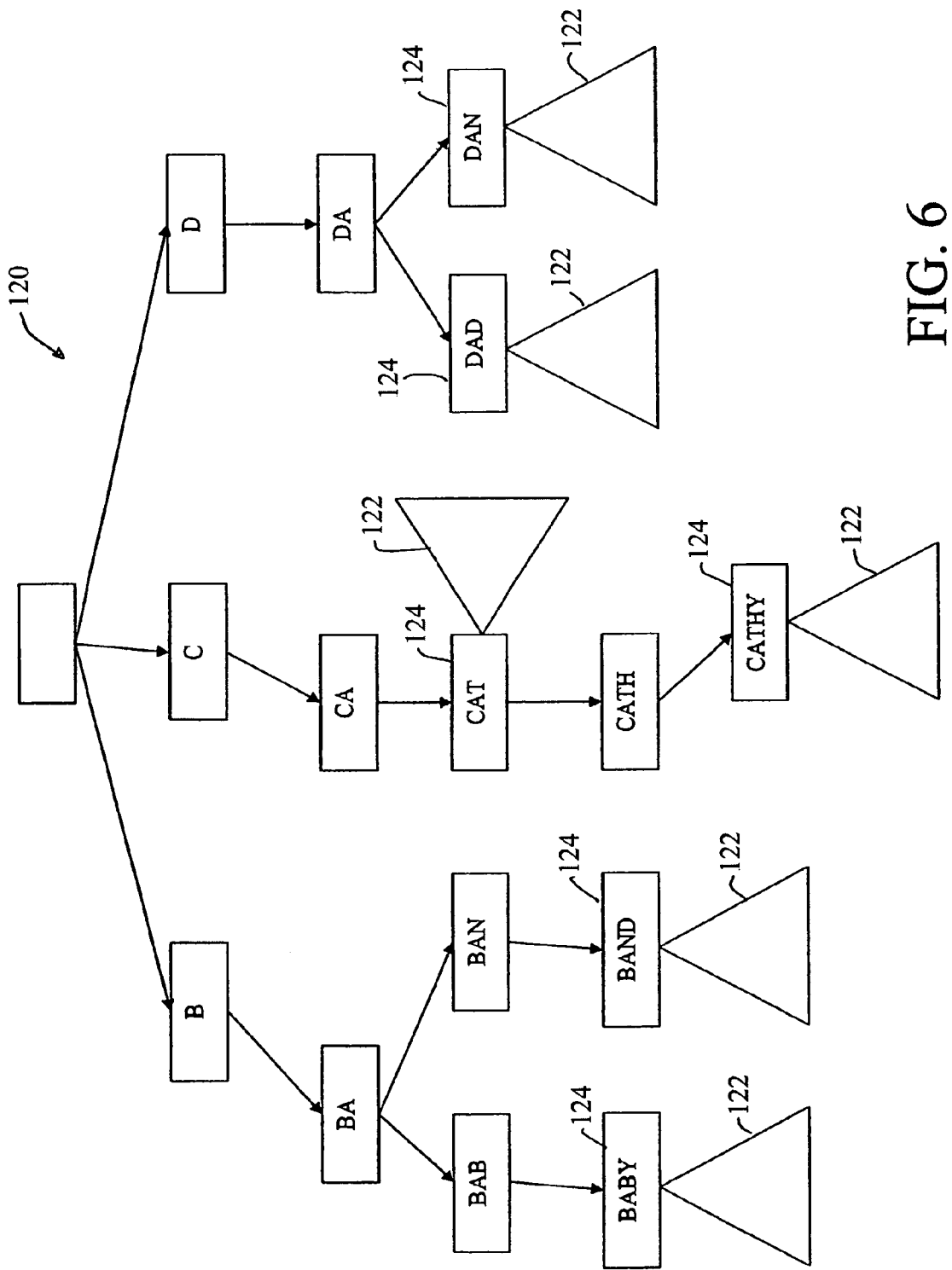
FIG. 6 is an exemplary trie structure according to one embodiment of this invention.

As will be appreciated by those skilled in the art following the teachings herein, the trie structure of FIG. 5, for preliminary explanation purposes contains nodes for potentially all combination of letters. In actual implementation, trie structures contain nodes according to need, such as illustrated in FIG. 6. FIG. 6 is an example illustration of a trie structure 120 for the metalabels "BABY", "BAND", "CAT", "CATHY", "DAD", and "DAN". In FIG. 6, only nodes related to actual metalabels are present, and unnecessary nodes do not exist. As in FIG. 5, the filenames of the electronic files are represented by triangles 122. Each triangle 122 is attached to one of the metalabel nodes 124, and includes filenames and file paths of the electronic files the user has assigned a metalabel with the metalabel matching the associated node 124.

In one embodiment of this invention, the additional hierarchical file structure is implemented as a double trie structure. Both tries of the double trie structure are desirably Patricia tries. The first trie uses the metalabels as keywords. As shown in FIG. 6, each node of the trie corresponds to a unique metalabel. Each node in turn desirably contains an internal secondary trie structure to further store a list of files that have been tagged with the specified metalabel. To provide faster results, the second trie of the double trie structure uses the filenames of the electronic files as the keywords, with the secondary trie structure, represented as the triangles in figures, containing the metalabels of the files.

For each add, modify, and update metalabel command, the trie structures are suitably modified. The file copy, move, and delete commands of a UNIX file system can be modified to create metalabeled copy, metalabeled move, and metalabeled delete commands. These commands modify the trie structures while performing the file system commands.

The following is an example of an algorithm for the double-trie implementation of the second hierarchical file structure of this invention.

Data Structures Used

1. File Trie: a Patricia Trie, with each node possibly containing a contains-metalabel sub-trie; and 2. Metalabel Trie: a Patricia Trie, with each node possibly containing a files-metalabeled sub-trie.

Adding a Metalabel to a File

```
addmetalabel(<filename>, <metalabel>)
    (i)  // Metalabel Trie Structure
        a. Locate the subtrie which is identified with the key
           <metalabel> in the Metalabel Trie
        b. If not found, create a node (and files-metalabeled subtrie) in
           the Metalabel Trie for the given metalabel.
        c. If subtrie already contains "filename",
               return error. (File is already tagged with the same
               metalabel)
           Else
               add "filename" to the files-metalabeled subtrie.
    (ii) // File Trie Structure
        a. Locate the contains-metalabel subtrie corresponding to the
           given filename in the File Trie.
        b. If not found, create a node (and contains-metalabel subtrie) in
           the File trie, for the given filename.
        c. If subtrie already contains "metalabel", return error. (File is
           already tagged with the same metalabel).
           Else
               add "metalabel" to the contains-metalabel subtrie.
```

Removing a Metalabel to a File

```
removemetalabel(<filename>,<metalabel>)
    1. // Metalabel Trie Structure.
        a. Locate the files-metalabeled subtrie corresponding to
           the given metalabel in the Metalabel Trie
        b. If not found, return error. (No such metalabel found)
        c. If subtrie doesn't contain "filename", return error. (No such
           metalabel for the file).
           Else
               i. remove "filename" from the files-metalabeled
                  subtrie.
              ii. if subtrie is empty, then remove the metalabel from
                  Metalabel Trie
    2. // File Trie Structure
        a. Locate the contains-metalabel subtrie corresponding to the
           given filename in the File Trie.
        b. if not found, return error. (No such file found in index)
        c. if subtrie doesn't contain "metalabel", return error. (No such
           metalabel for the file).
           Else
               i. remove "metalabel" from the contains-metalabel
                  subtrie.
              ii. if subtrie is empty, then remove the filename from
                  File Trie
```

List Metalabels of a File
listmetalabels(<filename>)

```
1. // File Trie Structure
    a. Locate the contains-metalabel subtrie corresponding to the
       given filename in the File Trie.
    b. if not found, return error. (No such file found in index)
       Else
           return the contents of the contains-metalabel subtrie.
```

List Files with a Metalabel

```
listfiles(metalabel)
    1. // Metalabel Trie Structure
        a. Locate the files-metalabeled subtrie corresponding to the
           given filename in the Metalabel Trie.
        b. if not found, return error. (No such metalabel found in index)
           Else
               return the contents of the files-metalabeled subtrie.
```

Remove File from the Index
removefile(filename)

```
1. Set Metalabelslist=listmetalabels(filename)
2. While metalabelslist not empty repeat
    a. remove a metalabel from the list
    b. call removemetalabel(filename,metalabel)
```

Update Index for Copy file Command
copyfile(src,dest)

```
1. Call removefile(dest).
2. Set Metalabelslist=listmetalabels(src)
3. While metalabelslist not empty repeat
    a. remove a metalabel from the list
    b. call addmetalabel(dest,metalabel)
```

Update Index for Move File Command
movefile(src,dest)

```
1. Call copyfile(src,dest).
2. Call removefile(src)
```

Search Files with the Metalabel
searchfiles(metalabelslist)

```
1. for each metalabel-i element of metalabelslist
    a. get files-i=listfiles(metalabel-i)
    b. if files-i == empty
           return null
    c. sort files-i
2. get fileslist by doing a "incremental intersection" of all files-i
3. return fileslist
```

In another embodiment of this invention, the second trie, File-Trie, is replaced with a change in the basic file system. The directory of the Linux/Unix file system is modified to incorporate meta-information. An extra field is added in the structure corresponding to the directory class. This stores meta-information. Information about the amount of data is also stored and indirect addressing is applied at the end and a pointer to a file containing extra information is stored. The data blocks of the directory desirably points to the directory structure. The directory structure of the file system, Ext2 is:

```
struct EXT2_DIR_ENTRY {
    DWORD inode; /* Inode number */
    WORD rec_len; /* Directory entry length */
    BYTE name_len; /* Name length */
    BYTE file_type;   /*File type */
    char name[EXT2_NAME_LEN]; /* File name */
};
```

The directory entries are the array of struct EXT2_DIR_ENTRY. The size of the each structure is given by the rec_len.

inode:—The inode number of the entry.

rec_len:—The length of the record.

name_len:—The length of the name of the file.

name:—The name of the file. The string is not NULL terminated.

The above entry is modified to include 2 more fields:

```
WORD    metalabel_len; /* Length of the metalabel field */
char    metalabels[ ]; /* The metalabels associated with this file */
```

Whenever the copy or move (rename) command is called, the "metalabels" structure corresponding to the files involved must also be updated. The get-metalabel, and set-metalabel commands, read/update the directory inode-structure. To convert the current file-system to the abstract-file-system of this invention, each directory in the current file system must be pre-processed to take care of the new fields.

The method of this invention is desirably performed by a data processing system. The steps the system user would take are the steps of entering the desired metalabels and entering the query. The system would desirably perform the steps of: providing the electronic file in a first hierarchical file structure; assigning the user-entered metalabel to the electronic file; organizing the electronic file into the second hierarchical file structure as a function of the metalabel; receiving a query from a user; searching the second hierarchical file structure as a function of the query; and returning to the user the electronic file(s) having the metalabel matching the query.

The method of this invention is desirably executed and implemented in a data processing system by software program code that is desirably stored on a computer-readable medium, such as a hard drive. In one embodiment of this invention, a computer-readable medium encoded with instructions for organizing a plurality of electronic files of a data processing system includes a first program code that, when executed by the system, establishes a first hierarchical file structure including the plurality of electronic files. As discussed above, each of the plurality of electronic files is identified by a filename in the first hierarchical file structure.

A second program code establishes a second hierarchical file structure, and desirably a plurality of additional hierarchical file structures, including the plurality of electronic files, each of the plurality of electronic files identified by a user-defined metalabel in the second hierarchical file structure. The program codes operate simultaneously, and the first and second hierarchical file structures exist simultaneously in the data processing system for the plurality of electronic files. The medium also includes a third program code for searching the second hierarchical file structure according to a user entered query.

As discussed above, in one embodiment of this invention, the second program code establishes a second hierarchical file structure comprising a trie with a plurality of nodes. Each of the nodes of the trie corresponds to one of the user-defined metalabels, and each of the nodes comprising an internal trie structure of the electronic files that have a matching metalabel.

The present invention is described in further detail in connection with the algorithm described above and the following results on various sample metalabels and queries which illustrate or simulate various aspects involved in the practice of the invention. It is to be understood that all changes that come within the spirit of the invention are desired to be protected and thus the invention is not to be construed as limited by these examples.

Algorithms for two types of metalabel searches were implemented on a Linux system: one for an abstract file system with no hierarchical metalabels and the other with hierarchical metalabel, as described above. The file system was populated with 10K and 100K files in the two experiments. Each of these search mechanisms were implemented in two ways, one where the system loaded the search program at search time, and the other where a client-server model was developed and the search procedure was implemented as a daemon process. In the first approach, both the query and total execution time (data loading and query) are reported.

In the system with no hierarchical metalabels, the system was augmented with a suggestion mechanism, where the union of all metalabels that were present in the reported files, which matched the search (metalabels), was also reported. The tests included times taken for both kinds of this system.

In the hierarchical system, the suggestions are always included for further refinement of the search. The suggestions include metalabels which are possible predecessors or successors of the current metalabel provided at the search query.

The efficiency of the method is evident from the time required to execute the search. For a system with 100K files, typical queries would require milliseconds. Even if the reported abstract folders contained files on the order of tens of thousands, the time required is less than a few seconds. Naturally these times would improve with utilization of well-known techniques for client-server programming such as caching. Further improvements arise from replacing the second trie structure with the modified inode structure as described above. Note that all changes to the files and metalabels are immediately reflected in the system.

No Hierarchical Metalabels

|  |  | All times in ms | | | | | |
|---|---|---|---|---|---|---|---|
|  |  | Index File Size | | | | | |
|  |  | 10k | | | 100k | | |
|  |  | Query | | | | | |
|  |  | Dad | Others | photo | Dad | others | photo |
|  |  | Number of Files reported | | | | | |
|  |  | 359 | 1258 | 420 | 14233 | 20132 | 16076 |
| Load at Search | Query Time: | | | | | | |
|  | With Suggestion- (other applicable metalabels displayed) | 14 | 54 | 22 | 790 | 1206 | 892 |
|  | Without Suggestion | 7 | 28 | 9 | 330 | 586 | 485 |
|  | Query Time + data loading | | | | | | |
|  | With Suggestion- (other applicable metalabels displayed) | 172 | 209 | 199 | 3236 | 3870 | 3634 |
|  | Without Suggestion | 163 | 183 | 167 | 2930 | 3285 | 2952 |
| Client-Server model: | | | | | | | |
| With Suggestion-(other applicable metalabel displayed) | | 17 | 66 | 25 | 1284 | 2182 | 11813 |
| Without Suggestion | | 9 | 33 | 16 | 363 | 605 | 505 |

Hierarchical Metalabels

|  |  | All times in ms | | | | | |
|---|---|---|---|---|---|---|---|
|  |  | Index File Size | | | | | |
|  |  | 10k | | | 100k | | |
|  |  | Query | | | | | |
|  |  | dad/ | others/ | uncle/others | dad/ | others/ | uncle/video |
|  |  | Number of Files | | | | | |
|  |  | 359 | 0 | 60 | 2745 | 0 | 571 |
| Load at Search | Query time | 18 | 12 | 13 | 96 | 44 | 55 |
|  | Query time + Data loading | 179 | 167 | 165 | 2633 | 2533 | 2535 |
| Client-Server model: | | 32 | 24 | 25 | 145 | 89 | 99 |

Thus, the invention provides a method for improved file searching through implementation of additional hierarchical file structures that exist in the background of a data processing system alongside and the traditional hierarchical directory tree file structure.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method in a data processing system of searching electronic files on a recordable storage medium of the data processing system; the method comprising:

providing electronic files into more than one hierarchical file structure in the data processing system, wherein each of the electronic files is identified by a filename in a directory or subdirectory of a file directory tree structure forming a first hierarchical file structure, and each of the electronic files is automatically organized by a data processor into a second hierarchical file structure according to a user-defined metalabel that is assigned to the each of the electronic files in addition to the filename, wherein the second hierarchical file structure comprises a Patricia trie and organizing the electronic files into the second hierarchical file structure comprises:

locating or creating a node in the trie that is identified with each metalabel of the electronic files;

associating the filename of each of the electronic files to a corresponding metalabel in the trie;

linking the metalabel of a first electronic file to a matching metalabel assigned to a second electronic file; and linking a second metalabel of the first electronic file to a matching second metalabel, wherein the matching second metalabel is assigned to at least one of the second electronic file or a third electronic file;

receiving a query from a user;

searching the second hierarchical file structure as a function of the query; and returning to the user an electronic file having a metalabel matching the query.

2. The method of claim 1, further comprising:

providing an electronic file in the first hierarchical file structure, the electronic file being identifiable in the first hierarchical file structure by a filename;

assigning a user-defined metalabel to the electronic file, wherein the electronic file includes the filename and the metalabel;

organizing the electronic file into the second hierarchical file structure as a function of the metalabel;

receiving query from the user;

searching the second hierarchical file structure as a function of the query; and returning to the user the electronic file.

3. The method of claim 1, wherein the metalabel is not displayed with the filename in the first hierarchical file structure to the user through a user interface associated with the data processing system.

4. The method of claim 1, further comprising automatically updating the second hierarchical file structure when one of the electronic files is moved within, copied, or deleted from the first hierarchical file structure.

5. The method of claim 1, wherein the second hierarchical file structure comprises a second Patricia trie and organizing the metalabels into the second trie comprises:

locating or creating a node in the second trie for each filename of the electronic files; and associating the metalabel of each of the electronic files to the corresponding filename in the second trie.

6. The method of claim 1, wherein the query includes the metalabel or a portion of the metalabel coupled with a wildcard symbol.

7. The method of claim 1, wherein the second hierarchical file structure comprises a UNIX file structure, wherein changes in the UNIX file structure are handled in mode.

8. The method of claim 1, wherein the first and second hierarchical file structures are partitioned across a network.

9. The method of claim 1, wherein the user is a software process.

10. A method in a data processing system of searching a plurality of electronic files in a first hierarchical file structure on a recordable storage medium of the data processing system, each of the electronic files including a filename, the method comprising:

assigning a user-defined metalabel to each of the electronic files;

organizing the electronic files as a function of the metalabels into a second hierarchical file structure existing simultaneously with the first hierarchical file structure on the recordable storage medium of the data processing system, each of the electronic files organized in both the first hierarchical file structure and the second hierarchical file structure, wherein the second hierarchical file structure comprises a Patricia trie including a plurality of nodes, each node for one of metalabels, and organizing the electronic files into the second hierarchical file structure comprises:

associating with each of the nodes the filename of each of the electronic files having a metalabel matching the node;

in king the metalabel of each of the electronic files to a matching metalabel assigned to one or more other of the electronic files; and for each of the electronic files having a second metalabel, linking the second metalabel to a matching second metalabel assigned to a second one or more other of the electronic files;

receiving a query from a user;

searching the metalabels of the second hierarchical file structure as a function of the query; and returning to the user as a search result each of the electronic files having a metalabel matching the query.

11. The method of claim 10, wherein the metalabel of each of the electronic files is not displayed in the first hierarchical file structure to the user through a user interface associated with the data processing system.

12. The method of claim 10, further comprising automatically updating the second hierarchical file structure when one of the electronic files is moved within, copied, or deleted from the first hierarchical file structure.

13. The method of claim 10, wherein the first hierarchical file structure comprises a plurality of directories and subdirectories.

14. The method of claim 10, wherein the query includes the metalabel or a portion of the metalabel coupled with a wildcard symbol.

15. A computer-readable storage medium encoded with instructions for organizing a plurality of electronic files of a data processing system, the encoded instructions comprising:

a first program code establishing a first hierarchical file structure including the plurality of electronic files, each of the plurality of electronic files identified by a filename in the first hierarchical file structure; and a second program code establishing a second hierarchical file structure including the plurality of electronic files, each of the plurality of electronic files identified by a user-defined metalabel in the second hierarchical file structure, each of the electronic files or organized in both the first hierarchical file structure and the second hierarchical file structure comprises a Patricia trie;

the second program code including code for assigning the user-defined metalabel to each of the electronic files, and automatically organizing the electronic files as a function of the metalabels into the second hierarchical file structure by: locating or creating a node in the trie that is identified with each metalabel of the electronic files; associating the filename of each of the electronic files to a corresponding metalabel in the trie; linking the metalabel of a first electronic file to a matching metalabel assigned to a second electronic file; and linking a second user-defined metalabel to a matching second metalabel, wherein the matching second metalabel is assigned to at least the second electronic file or a third electronic file; and the first and second hierarchical file structures existing simultaneously for the plurality of electronic files.

16. The computer-readable storage medium according to claim 15, wherein the second program code establishes a plurality of hierarchical file structures including the plurality of electronic files identified by user-defined metalabels and existing simultaneously with the first hierarchical file structure.

17. The computer-readable storage medium according to claim 15, further comprising a third program code for searching the second hierarchical file structure according to a user entered query.

18. The computer-readable storage medium according to claim 15, wherein the second hierarchical file structure comprises a trie with a plurality of nodes, each of the nodes of the trie corresponding to one of the user-defined metalabels, and each of the nodes comprising an internal trie structure of the electronic files that have a matching metalabel.

* * * * *